United States Patent Office 3,755,466
Patented Aug. 28, 1973

3,755,466
SELECTIVE DECOMPOSITION OF HYDROPEROX-IDES IN THE PRESENCE OF POLYMERIC PEROXIDES AND RECOVERY OF THE POLYMERIC PEROXIDES
Charles J. Norton, Berkeley, Calif., and Dennis E. Drayer, Littleton, Michael J. Reuter, Denver, and Kent W. Robinson, Littleton, Colo., assignors to Marathon Oil Company, Findlay, Ohio
Filed Nov. 4, 1968, Ser. No. 772,966
Int. Cl. C07c 73/00
U.S. Cl. 260—610 B       7 Claims

ABSTRACT OF THE DISCLOSURE

Mixtures comprising hydroperoxides and polymeric peroxides obtained by the preaeration of unsaturated hydrocarbons are treated with aqueous bisulfite to selectively destroy the more reactive hydroperoxides. The resultant mixture is solvent extracted and the extract phase, which contains the polymeric peroxides, is distilled to remove the solvent, cooled and centrifuged to produce a product of polymeric peroxides. These economically prepared polymeric peroxides are useful, interalia, as free radical initiators and as catalysts in polymerization reactions.

CROSS REFERENCES TO RELATED APPLICATIONS

As taught by our copending application Ser. No. 520,-632, filed Jan. 14, 1966, now U.S. Pat. 3,522,297 and assigned to the same assignee of the present invention, the contacting of olefins and other unsaturated hydrocarbons with oxygen-containing gases produces hydroperoxides and polymeric peroxides whose presence enhance later reaction of such hydrocarbons with bisulfites and similar addition reagents in detergent synthesis applications.

BACKGROUND OF THE INVENTION

The field of this invention relates to the formation of a mixture of hydroperoxides and polymeric peroxides derived from the aeration of olefinic or other unsaturated hydrocarbons. It also relates to a method for selectively destroying the highly reactive hydroperoxides and to a method for isolating and recovering the polymeric peroxides. The invention more particularly relates to a process for the preparation of organic sulfonate detergents by the bisulfite addition to preaerated unsaturated hydrocarbons and to the selective destruction of the hydroperoxides and recovery of the polymeric peroxides formed during the preaeration step.

Heretofore, organic or polymeric peroxides have been prepared by processes which utilize expensive reagents, such as hydrogen peroxide, special equipment, or otherwise employ uneconomical steps. Suitable commercial organic peroxides which are relatively stable, are generally prepared using expensive and bizarre starting materials.

Another problem which exists, and is especially apparent in the production of organic sulfonate detergents from the bisulfite addition to olefins and similar unsaturated hydrocarbons, is that often there are present substantial amounts of hydroperoxides which present problems, as for example: the hydroperoxides are highly reactive, have low thermal decomposition temperatures, and are unstable and hard to store; the hydroperoxides pose a handling problem and discolor, radically decomposing into such compounds as alcohols, acids, ketones, inhibitors, deleterious gums, etc. In admixture with these hydroperoxides are the stable, well-defined organic or polymeric peroxide compositions. What is needed and what the process of this invention accomplishes is a method for selectively destroying these deleterious hydroperoxides which are in admixture with the organic, polymeric peroxides and to further separate the organic, polymeric peroxides from a product mixture containing the same.

SUMMARY OF THE INVENTION

We have found that the addition of bisulfite to a mixture comprising hydroperoxides and organic polymeric peroxides selectively destroys the hydroperoxides and upon extraction of the product mixture with a suitable solvent, the peroxides can be separated as a solid product. More specifically, an embodiment of this invention involves the steps of (1) preaerating organic unsaturated hydrocarbons (2) adding an aqueous bisulfite solution to the preaerated organic unsaturated hydrocarbons under controlled conditions of temperature and reaction time; (3) allowing the hydrocarbon (unreacted oil) phase containing the organic peroxides to separate by solvent extraction, and (4) recovering the organic peroxides by distillation of the extract phase to remove the solvent, cooling, and finally, centrifugation.

The aqueous phase formed in the solvent extraction step is basically composed of organic sulfonates which are useful as highly biodegradable low-foam detergents. Utilizing the process of this invention enables the organic sulfonate detergent composition to be essentially free from hydroperoxides and its decomposition products, such as alcohols, acids, ketones, inhibitors, and gums, which may pose problems of separation in order to maintain a desirably pure detergent composition.

The organic peroxides, which are more particularly characterized as dimeric or polymeric peroxides, are useful in general as highly stable peroxides. For instance, they are useful as radical initiators in chemical reactions, as well as catalysts in the polymerization or copolymerization of, say, polyesters, styrenes, vinyl chlorides, etc., and similar polymerization reactions. Furthermore, the peroxides of this invention are economically prepared because of ready availability and low cost of the unsaturated hydrocarbon raw materials, especially the preferred olefins, and because of the simplicity of operation and apparatus needed.

BRIEF DESCRIPTION OF THE DRAWING

The accompanying figure is a block diagram flow scheme of the preferred method of carrying out our invention.

DESCRIPTION OF THE PREFERRED EMBODIMENTS

Figure 1:
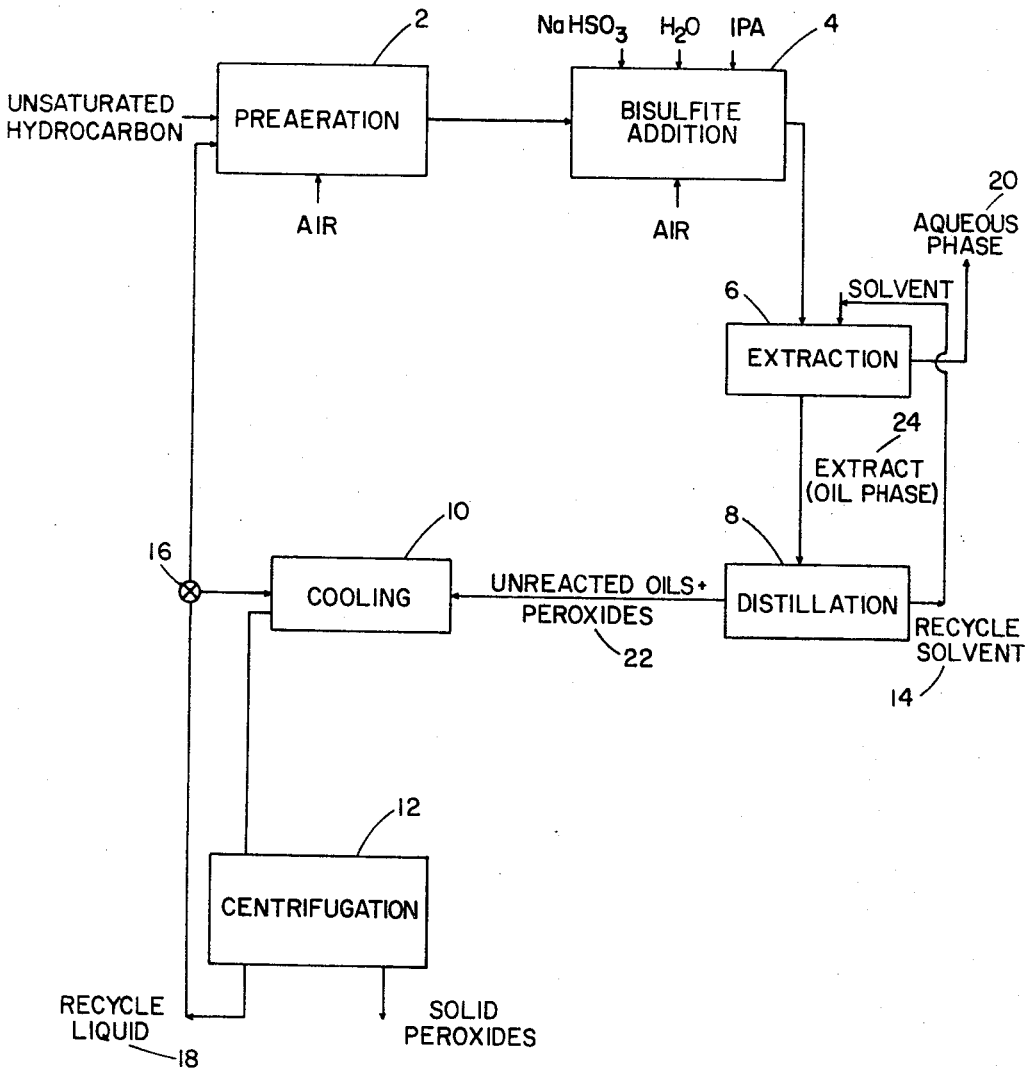

The hydrocarbon starting materials useful in the present invention are unsaturated, having either triple or more preferably, double bonds, with at least one allylic hydrogen. In general, although aromatics, cyclic or branched chain olefins containing at least one unsaturated bond can be utilized, acyclic straight-chained olefins are preferred containing preferably from about 6 to about 30 carbon atoms and more preferably from about 10 to about 22 carbon atoms, and most preferably from about 14 to about 19 carbon atoms per molecule. While polyenes may be utilized, monounsaturated compounds are preferred. The most preferred compounds in the present invention will be the alpha (that is, terminal) olefins. Mixtures of the above hydrocarbons may be utilized and it is a feature of the present invention that the reaction proceeds with relative insensitivity to the molecular weight or chain length of the hydrocarbon raw materials.

Examples of the hydrocarbons having at least one allylic hydrogen which may be utilized with the present invention are olefins, e.g. cyclohexene; alpha-, omega-hexadiene, 2,6-octadiene, 2,18-eicosodiene, 2-methyl-3-hexene, 5-decene, and alpha-olefins such as 1-hexene, 3- methyl-1-hexene, 1-decene, 1-hexadecene. The principal source of many of such raw materials will be thermally cracked petroleum streams, shale oils, synthetic hydrocarbon mixtures, etc., many of which are particularly rich in straight-chain mono-olefins and are therefore preferred for the purposes of the present invention. Mixtures of any of the above may be employed, such as a stream of $C_{15}$–$C_{18}$ Chevron alpha-olefins.

The first step of the process involves preaeration 2 of the hydrocarbon feed materials to produce a feed rich in hydroperoxides and peroxides. The preaeration may be accomplished with an oxygen-containing gas mixture which does not interfere with the reactions of the present invention and which contains a substantial amount of oxygen, preferably at least about 5% and more preferably at least about 20% oxygen. For reasons of economy, air is the most preferred oxygen-containing gas. The temperature during preaeration is preferably from about 0 to about 200 and more preferably from about 50 to about 150° C., where the contact time is preferably from about 0.01 to about 10 and more preferably from about 0.5 to about 2 hours. Generally, from about 5 to about 10 weight percent of the unsaturated hydrocarbon feed but as much as 70 or more weight percent of the feed will be converted to hydroperoxides and peroxides. For the preferred alpha-olefin starting materials, the following reaction during preaeration is believed to take place:

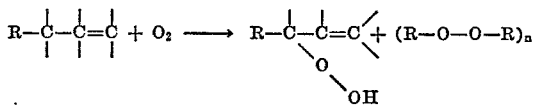

where the R corresponds to alkyl or alkenyl or substituted derivatives thereof having 6 to 30 carbon atoms as described above, and where $n$ will take on integer values from 1 to about 3. The above two products are hydroperoxides and polymeric peroxides respectively and are present as a mixture combined with unsaturated hydrocarbon feed material. The polymeric peroxide component may take on a variety of substituents including a —O—OH group. During the preaeration, the conversion of starting material to hydroperoxides and polymeric peroxides may be increased by, in general, controlling the temperature at a point where thermal decomposition of the hydroperoxide is negligible and increasing the contact time, as desired. Contact of the hydrocarbons to be preaerated will preferably be accomplished by sparging in the oxygen containing gas through a suitable diffuser, e.g. alundum, sintered glass, or inert perforated pipe. Normally, the agitation provided by the air will be sufficient, but in some cases, results can be improved by mechanical agitation, e.g. by stirring or shaking or, particularly preferred, the high shear agitation such as that provided by contra-rotating stirring devices.

The pressure during the preaeration step is not critical and can range from about 0.1 to about 1,000 atmospheres, absolute, with pressures of about one to about 100 atmospheres absolute being more preferred and pressures of about 2 to about 20 atmospheres absolute being most preferred. It is important that the explosive ranges of hydrocarbons with oxygen be avoided during the preaeration, such as can be detected and controlled by conventional explosimeters.

The next step of the process involves the addition of bisulfite 4 to the preaerated unsaturated hydrocarbon to selectively substantially destroy the compounds having only hydroperoxide substituents which, if left in the reaction mixture, would become a nuisance, without appreciably affecting the polymeric peroxides present in the reaction mixture. Alkali metal or ammonium bisulfite salts are the most preferred source of bisulfite ions. However, any non-interfering compound which forms bisulfite ions in the reaction mixture may be utilized. In addition to bisulfites, non-interfering pyrosulfites and metabisulfites or other sulfites may be used as may other compounds which produce bisulfites in situ under the condition of the reaction, as for instance, by bubbling $SO_2$ in situ in basic solution. Preferably, from about 0.1 to about 10 and more preferably from about 0.5 to about 5 and most preferably from about 1.0 to about 1.5 equivalents of bisulfite are utilized per equivalent of hydroperoxide present. The temperatures during the bisulfite addition step are preferably from about 0 to about 200° C. and more preferably from about 20 to about 150° C., and most preferably from about 30 to about 100° C. Pressure during the bisulfite addition is not narrowly critical and may be from about 1 to 10,000 p.s.i.a., but pressures from about 10 to about 100 p.s.i.a. are more preferred. Generally, atmospheric pressure is favorable. The time of reaction will generally be preferably from about 0.01 to about 10 hours and more preferably from about 0.5 to about 2.0 hours.

The bisulfite addition reaction is preferably conducted in the presence of water, although more preferably a co-solvent system is utilized wherein there are from about 0.1 to about 10 and more preferably from 0.5 to 2 volumes of water present per volume of the cosolvent. The cosolvent is substantially non-reactive with the starting materials and the end product. Suitable cosolvents include liquid hydrocarbons at suitable boiling points, esters, ethers, alcohols, glycols, amines, and amino alcohols. Particularly preferred are organic hydroxyl containing compounds, especially low molecular weight alcohols, $C_1$ through $C_{10}$, preferably, and more preferably $C_1$ through $C_5$, e.g. methanol, ethanol, and isopropyl alcohol (IPA), because of their good solubilizing properties, ready availability, and convenient recovery. The most readily available alcohols useful for this invention are the secondary alcohols and a preferred method of recovery of the solvent is by vacuum flashing. From 0.25 to about 10 volumes of water-cosolvent will generally be utilized per volume of unsaturated hydrocarbon reactant, and about 1:1 is the most preferred volume ratio. The cosolvent system acts to at least partially solubilize the hydrocarbon bisulfite mixture with the most preferred reaction media comprising 1 volume of water per volume of IPA.

For best conversions of the preaerated unsaturated hydrocarbons to organic sulfonates for detergent composition use, the bisulfite addition reaction is initiated and sustained by addition of a free radical initiator. The hydroperoxides and peroxides in the reaction mixture act as free radical initiators, although it is preferable to further add a quantity of an oxygen-containing gas, which preferably contains at least 2% and more preferably 20% or more oxygen by volume. If desired, pure reagent peroxides such as benzoyl peroxide, acylperoxide, and tertiary peroxides such as tert-butyl peroxides may be used to further initiate the reaction, although employment of these expensive initiators is not needed in most instances. Preferably from about 0.01 to about 1 mole and more preferably from about 0.05 to about 0.20 mole of air are diffused through the reaction mixture per mole of unsaturated hydrocarbon charged.

If, as in the preferred embodiment of this invention, it is desired to produce high quality alkane sulfonate detergents along with recovering the valuable polymeric peroxides, then it is desirable to improve the yield of alkane sulfonate by controlling the pH within a range of from 5 to about 9 during the bisulfite addition reaction step. Suitable pH controlling agents include acid, caustic, and more preferably, buffer systems exemplified by alkali or ammonium monobasic phosphate, dibasic phosphate, tripolyphosphate, carbonate, and borax systems, etc.

Catalysts are not necessary to the reaction of the present invention, but the co-catalytic systems disclosed in copending application Ser. No. 486,137 to the same assignee filed Sept. 9, 1965 can be employed in the present invention.

The bisulfite addition reaction step 4 is preferably conducted under vigorous agitation, e.g. mechanical stirring. The apparatus utilized will vary with the temperatures and pressures selected but will, in general, be a conventional autoclave or fluid type reactor.

The next step of the reaction is to isolate and extract 6 the polymeric peroxides from the organic sulfonate mixture. This is accomplished by solvent extraction, where upon addition of a suitable low molecular weight hydrocarbon such as hexane with 10% added isopropyl alcohol (IPA), an aqueous phase 20 comprising the sulfonate detergent and an extract 24 (oil phase) comprising the peroxides is formed so that upon separation, such as by decantation, or by skimming, etc., the phases will be separated. The extract phase 24 contains in addition minor amounts of hydroperoxide which were not destroyed. The aqueous phase 20 can be further processed as by drying and addition of desirable additives such as phosphate builders, etc. for eventual detergent utilization.

The extract phase 24 containing the desirable polymeric peroxides contains also the solvent, such as hexane, which is conveniently recycled 14 to the extraction step 6 by a single distillation 8. The raffinate 22 from the distillation contains unreacted oils, polymeric peroxides, and minor amounts of hyroperoxides. This raffinate is preferably cooled 10 by chilling to a temperature above the freezing point of the unreacted oils or as to otherwise encourage formation of a solid phase, as by aging and conditioning of the unreacted oils.

The solid phase formed in the cooling step is substantially pure solid polymeric peroxides which are advantageously separated by centrifugation 12 or by other methods of separating solids from liquids such as by filtration. The remaining liquid from the centrifugation step is rich in unreacted oils, some pelymeric peroxides along with minor amounts of hydroperoxide. This liquid is preferably recycled 18 either to the preaeration step 2 or to the cooling step 10 for further separation, or both, as desired, where recycling of the liquid is controlled by two-way valve 16.

This process is conveniently carried out on a batch basis, but economically it is desirable to maintain continuous flows of materials without any appreciable loss of peroxides for an economically feasible process.

In determining the amounts and concentration of the hydroperoxides and polymeric peroxides, peroxide number is used. This phrase refers to the number obtained by a peroxide number determination by standard iodometric titration with sodium thiosulfate (the number of milliequivalents $Na_2S_2O_3$ required to titrate one kilogram sample of the preaerated product). Hercules Method I and Method III of [Mair (R. D. and Graupner, Alda J.) Determination of Organic Peroxides by Iodine Liberation Procedures, Analytical Chemistry, volume 36, No. 1, pp. 199–204 (January 1964)] are used, respectively, to evaluate the peroxide number of the mixture comprising the hydroperoxides and polymeric peroxides. The titers of Method I destroy the more reactive hydroperoxides, whereas the titers of the Method III destroy all of the peroxides including the polymeric peroxides and the hydroperoxides, so that the amount of stable polymeric peroxides is determined by the differences between the titers of Methods I and III. Thus, the amount of bisulfite added in the bisulfite addition step is determined by a Method I titer procedure so that the addition of bisulfite selectively substantially destroys the more reactive hydroperoxides while not destroying the more stable polymeric peroxides. Hercules Method I utilizes a sodium iodide IPA-acetic acid reagent to destroy the hydroperoxides and convert them to alcohols and similar decomposition products. Method III on the other hand utilizes a sodium iodide mineral acid titration procedure with higher temperatures and longer contact times than in Method I to destroy both the hydroperoxides and the polymeric peroxides.

The following example illustrates that upon addition of bisulfite, the peroxide number by Method I is reduced from 352 to about 15, showing that the hydroperoxides were essentially destroyed, while the polymeric peroxides were only silghtly destroyed, as evidenced by a reduction in peroxide number by Method III from 1111 to 1011. The final solid polymeric peroxide product has a peroxide number of 1.7 by Method I and 2340 by Method III and has excellent half-life characteristics comparable, for example, to the commercial 2,5-dimethyl-2,5-bis(t-butyl peroxy)-hexane and t-butyl hydroperoxide initiators. These commercial peroxide initiators are very expensive in comparison with the cost of producing the polymeric peroxides of the present invention. While this example is illustrative of a preferred embodiment of this invention, it is not meant to limit it in any way.

Example 52.6 lbs./hr. of $C_{15}$–$C_{18}$ Chevron alpha-olefins are fed continuously to a 10 gallon Pfaudler (glass-lined) reactor and contacted for 3½ hours with air bubbled through the olefin at the rate of 1 cubic foot/minute. The temperature is held at 265° F. (130° C.) and the pressure is 45 p.s.i.a. The preaerated olefin has a peroxide number I of 352 and a peroxide number III of 1111. To these olefins are added sodium bisulfite at a rate of 2.32 lbs./hr., continually pumped into the reactor along with 4.63 lbs. of IPA per hour and 5.89 lbs. of water per hour. The reactor level is held to 8 gallons with the pumping rates such that there is an average four hour residence time. The vapor phase in the reactor is controlled at between 2 and about 5 percent by volume of oxygen by a chromatographic analysis-control system. The temperature is held at 70° C. for two hours, at reflux temperatures where the reactor is fitted with a reflux condenser. An oil layer forms and is extracted wtih a solution of 90% by weight hexane and 10% by weight IPA. The aqueous phase is removed for further detergent formulation application, and the extract phase is distilled at 141° C. and the solvent overhead vapors are recycled to the extraction step. The unreacted oil bottoms have a peroxide number I of 15 and a peroxide number III of 1011. These bottoms are cooled to 21° C. where a solid-like substance is formed in the bottom of the tank. The mass is centrifuged and separated by decantation to form a liquid phase basically comprising unreacted oils having a peroxide number I of 15 and a peroxide number III of 1011 and a solid phase which has a peroxide number I of 1.7 and a peroxide number III of 2340. The liquid phase is recycled to the Pfaudler reactor for further preaeration.

It should be understood that the invention is capable of a variety of modifications and variations which will be made apparent to those skilled in the art by a reading of the specification and which are to be included within the spirit of the claims appended hereto.

What is claimed is:

1. A process for the preparation of organic polymeric peroxides substantially free of hydroperoxides comprising the steps of
    (1) aerating organic acyclic unsaturated hydrocarbons having about 6 to about 30 carbon atoms and having at least one allylic hydrogen to form organic hydroperoxides having from 6 to 30 carbon atoms per molecule, and organic polymeric peroxides derived therefrom, at a temperature of from about 0 to about 200° C., a pressure of from about 0.1 to about 1000 atmospheres absolute and for a contact time of from about 0.01 to about 10 hours,
    (2) adding an aqueous solution of alkali metal or ammonium bisulfite, pyrosulfite, or metabisulfite to form a hydrocarbon phase and an aqueous phase where there are from 0.1 to 10 equivalents of bisulfite added per equivalent of said organic hydroperoxide at from 0 to 100° C. for from 0.01 to 10 hours,
    (3) separating said hydrocarbon phase, which phase is rich in organic polymeric peroxides,
    (4) recovering the organic polymeric peroxides from the hydrocarbon phase.

2. The process of claim 1 wherein the separation is carried out by solvent extraction.

3. The process of claim 1 wherein the organic unsaturated hydrocarbons are alpha-olefins having from 6 to 30 carbon atoms per molecule and where the organic peroxides are polymeric peroxides having the following structure:

$$(R-O-O-R)_n$$

where $n = 1, 2,$ or 3 and the R's may be the same or different, are alkyl, alkenyl, or substituted derivatives thereof containing from 6 to 30 carbon atoms.

4. The process of claim 1 wherein the bisulfite is sodium bisulfite.

5. The process of claim 2 wherein the solvent used to extract the unsaturated organic hydrocarbon phase comprising organic peroxides is hexane.

6. The process of claim 1 wherein the amount of bisulfite added is substantially equivalent to the titratable amount of hydroperoxides present in the reaction mixture.

7. A process for preparing polymeric peroxides by selectively destroying organic hydroperoxides from a mixture comprising organic polymeric peroxides and organic hydroperoxides each containing from about 6 to about 30 carbon atoms, comprising:

(1) adding from 0.1 to 10 equivalent of bisulfite per equivalent of organic hydroperoxide at from 0 to 100° C. for from 0.01 to 10 hours, (2) solvent extracting a phase comprising the organic peroxides, (3) distilling off the solvent under conditions which do not destroy the polymeric peroxides, cooling and centrifuging the polymeric peroxide-rich raffinate phase, and (4) recovering the solid polymeric peroxides.

References Cited
UNITED STATES PATENTS

| | | | |
|---|---|---|---|
| 2,522,016 | 9/1950 | Denison, Jr., et al. | 260—610 |
| 3,349,122 | 10/1967 | Segessemann. | 260—513 |

BERNARD HELFIN, Primary Examiner

W. B. LONE, Assistant Examiner